United States Patent
Yu et al.

(10) Patent No.: US 12,423,926 B2
(45) Date of Patent: Sep. 23, 2025

(54) XR MULTI-WINDOW CONTROL

(71) Applicant: NTT DOCOMO, INC., Tokyo (JP)

(72) Inventors: Young-Cheol Yu, Palo Alto, CA (US); Yuya Tanaka, Palo Alto, CA (US); Yoji Osako, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 214 days.

(21) Appl. No.: 18/119,708

(22) Filed: Mar. 9, 2023

(65) Prior Publication Data

US 2024/0037865 A1 Feb. 1, 2024

Related U.S. Application Data (60) Provisional application No. 63/393,175, filed on Jul. 28, 2022.

(51) Int. Cl.
  *G06T 19/00* (2011.01)
  *G06F 3/01* (2006.01)
  *G06F 3/04815* (2022.01)

(52) U.S. Cl.
  CPC ............ *G06T 19/006* (2013.01); *G06F 3/017* (2013.01); *G06F 3/04815* (2013.01)

(58) Field of Classification Search
  CPC .... G06T 19/006; G06F 3/017; G06F 3/04815
  See application file for complete search history.

(56) References Cited

U.S. PATENT DOCUMENTS

| | | |
|---|---|---|
| 2016/0048530 A1 | 2/2016 | Sato et al. |
| 2017/0076502 A1* | 3/2017 | Chen ................ G06F 3/011 |
| 2017/0330387 A1 | 11/2017 | Dearman et al. |
| 2020/0372711 A1 | 11/2020 | Wu |
| 2021/0311601 A1* | 10/2021 | Chandler .............. G06F 3/0485 |
| 2022/0084279 A1* | 3/2022 | Lindmeier .............. G06T 15/20 |
| 2022/0253188 A1* | 8/2022 | Berliner ................. G09G 5/10 |

FOREIGN PATENT DOCUMENTS

| | | |
|---|---|---|
| JP | 2008-204186 A | 9/2008 |
| JP | 2016-042253 A | 3/2016 |

OTHER PUBLICATIONS

Office Action received for Japanese Patent Application No. 2023-042851, mailed on Feb. 6, 2024, 4 pages (2 pages of English Translation and 2 pages of Office Action).

Decision to Grant a patent received for Japanese Patent Application No. 2023-042851, mailed on Apr. 2, 2024, 5 pages (2 pages of English Translation and 3 pages of Original Document).

* cited by examiner

*Primary Examiner* — Kee M Tung
*Assistant Examiner* — Xiaoming Wei
(74) *Attorney, Agent, or Firm* — Womble Bond Dickinson (US) LLP (57) ABSTRACT

Methods and apparatuses for performing multi-window control in a user interface are disclosed. In some embodiments, the method includes displaying the user interface in a display of an extend reality (XR) device, where the user interface includes a graphical user interface (GUI) element and a number of objects. The method can also include detecting selection of the GUI element in the UI; moving a set of objects being displayed on the display into a window on the display; detecting a selection of one or more of objects in the set of objects by tracking movement of a user; and displaying selected objects of the one or more objects in front of a user.

20 Claims, 7 Drawing Sheets

XR MULTI-WINDOW CONTROL

PRIORITY

The present application claims the benefit of U.S. Provisional Patent Application No. 63/393,175, filed on Jul. 28, 2022 and entitled "XR MULTI-WINDOW CONTROL", which is incorporated by reference in its entirety.

BACKGROUND

Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Various XR environments exist, allowing representations of users to move about and speak with one another. However, the user interface (UI) and user experience (UX) are limited. For example, the user interfaces often rely on hand tracking that doesn't always operate effectively and may even be uncomfortable for users.

SUMMARY

The present disclosure is directed to performing multi-window control in a user interface, substantially as shown in and/or described in connection with at least one of the Figures, as set forth more completely in the claims.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

In the following description, numerous details are set forth to provide a more thorough explanation of the present disclosure. It will be apparent, however, to one skilled in the art, that the present disclosure may be practiced without these specific details. In other instances, well-known structures and devices are shown in block diagram form, rather than in detail, to avoid obscuring the present disclosure.

Methods and apparatuses for performing multi-window control in a user interface are disclosed. In some embodiments, the user interface is displayed in a display of an artificial reality, extended reality, or extended reality (collectively "XR"), where the user interface includes a graphical user interface (GUI) element (e.g., a gather button) and a number of objects in a virtual environment. In response to detecting selection of the GUI element in the UI, the XR device moves, or otherwise gathers, a set of objects being displayed on the display into a window on the display presented in front of a user. At this point, the user can select and manipulate those objects.

Embodiments of the disclosed technology may include or be implemented in conjunction with an artificial reality, extended reality, or extended reality (collectively "XR"), which is a form of reality that has been adjusted in some manner before presentation to a user, which may include, e.g., virtual reality (VR), augmented reality (AR), mixed reality (MR), hybrid reality, or some combination and/or derivatives thereof. Extended reality content may include completely generated content or generated content combined with captured content (e.g., real-world photographs). Additionally, in some embodiments, extended reality may be associated with applications, products, accessories, services, or some combination thereof, that are, e.g., used to perform activities in an artificial reality. The extended reality system that provides the extended reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real-world. For example, a MR headset could be shaped as a pair of glasses with a pass-through display, which allows light from the real-world to pass-through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Figure 1:
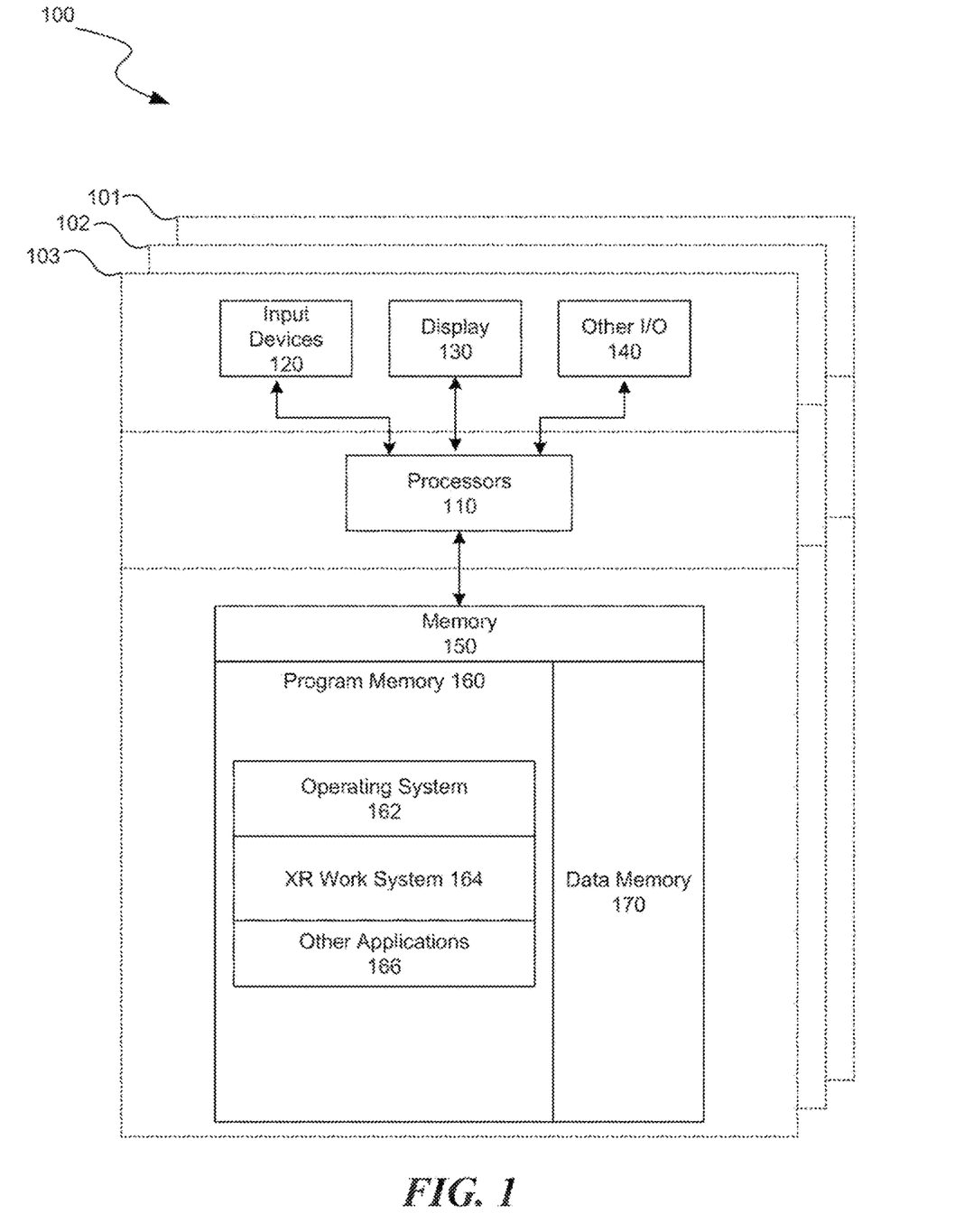
FIG. 1 is a block diagram illustrating an overview of devices on which some implementations of the disclosed technology can operate.

Several implementations are discussed below in more detail in reference to the Figures. FIG. 1 is a block diagram illustrating an overview of devices on which some implementations of the disclosed technology can operate. The devices can comprise hardware components of a computing system 100 that can create, administer, and provide interaction modes for an XR environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor (s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye or head direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XR work system 164, and other application programs 166. Memory 150 can also include data memory 170 that can include information to be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
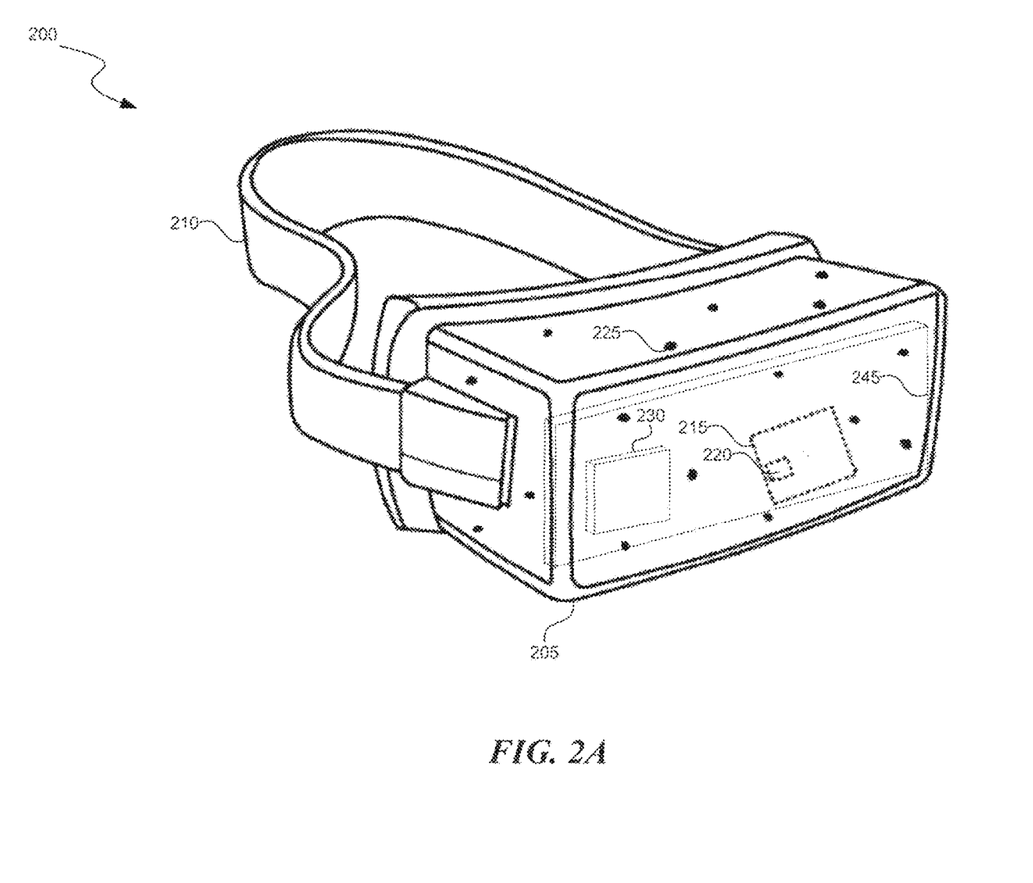
FIG. 2A is a wire diagram of a head-mounted display (HMD) 200, in accordance with some embodiments.

FIG. 2A is a wire diagram of a head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real-world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200

(e.g., via light emitted from the HMD 200) which the PC can use, in combination with output from the IMU 215 and position sensors 220, to determine the location and movement of the HMD 200.

Figure 2B:
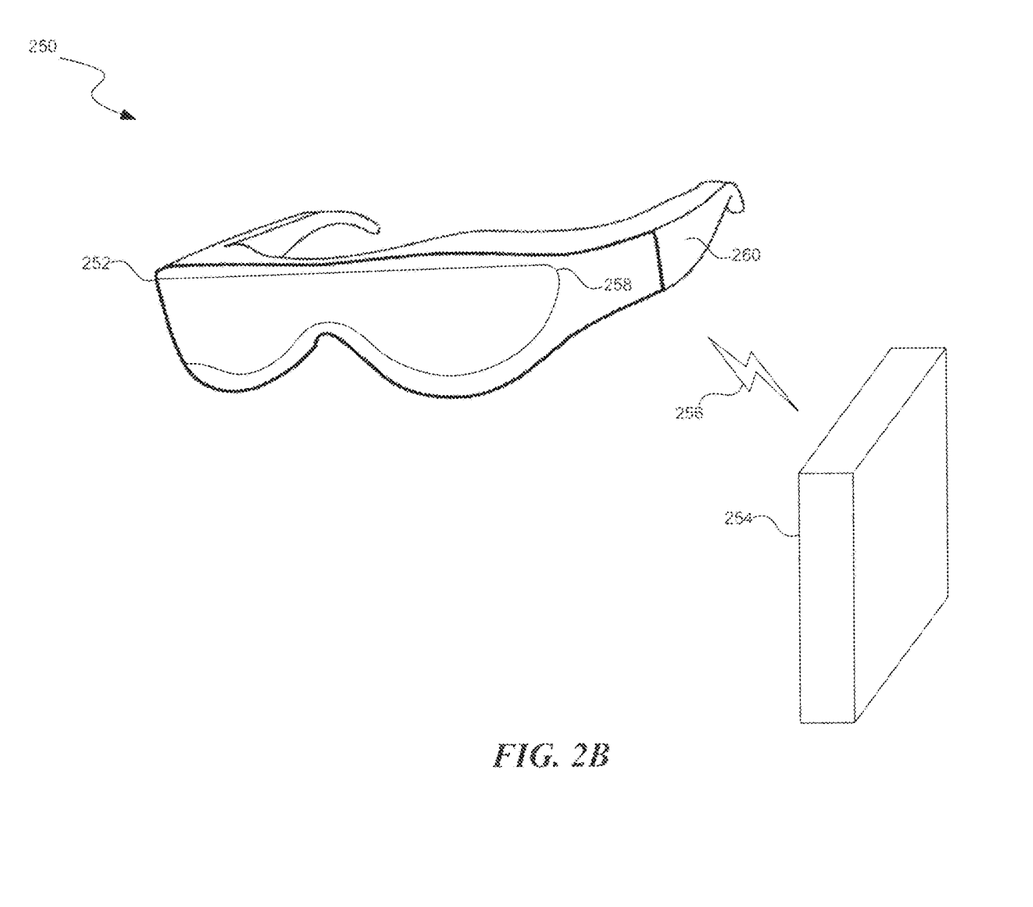
FIG. 2B is a wire diagram of a mixed reality HMD system that includes a mixed reality HMD and a core processing component.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real-world.

Similarly, to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

In various implementations, the HMD 200 or 250 can also include additional subsystems, such as an eye tracking unit, a head tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

XR Multi-Window Control

Current XR platforms do not provide an easy way to gather objects. This situation makes interacting with a virtual environment difficult, particularly when a user moves to a new area (e.g., a new room, a new view) and cannot see the objects at a glance. For example, some objects may be behind the user in the room and not visible to the user after they entered the room. In order to gather objects in front of the user, the user needs to open an application or 2D windows again to get the objects to be shown in front of the user.

In some embodiments, the XR device includes a multi-window control feature for controlling the user interface. In some embodiments, the multi-window control is a feature that gathers together all the objects that are being displayed in the user interface of the XR device (e.g., objects in a virtual room being displayed to the user, etc.) and shows the objects that the user may want to use in front of them. That is, users can gather all the objects (e.g., two dimensional (2D) objects, three dimensional (3D) objects, etc.) that are being displayed in the user interface of the XR device into one virtual area (e.g., a window). In some embodiments, the objects are gathered neatly for into one virtual area in which the objects are shown in front of the user. In some embodiments, the objects are neatly gathered into an arrangement. The arrangement can be in rows and columns or other well-known configuration that facilitates a user's interaction with the objects being displayed. This gathering feature is particularly useful when the user does not know or cannot see all the available objects. For example, there may be multiple objects in a room (e.g., objects in the front, back and sides of the user) and using the gathering operation enables all, or many, of the objects to be quickly displayed in front of the user.

In some embodiments, the XR device displays a gather button or other graphical user interface (GUI) element in the virtual environment that can be selected to cause the object gathering operation to be performed. By selecting the gather button, the objects being displayed in the user interface are gathered neatly and displayed in front of a user. In some embodiments, the selection of the gather button (or other GUI element) can be made via a virtual trackpad, such as described, for example, in U.S. patent application Ser. No. 18/119,697, entitled "XR Virtual Trackpad", concurrently filed on Mar. 9, 2023. In some other embodiments, the selection may be performed by using tapless selection, which is described in more detail below. In some other embodiments, the selection of the gather button is performed using a controller or via hand tracking. In some embodiments, this gathering button can be used every time a user enters a new virtual room or virtual location using the XR device.

When gathered, the user is able to manage and/or manipulate the objects. In some embodiments, once all the objects are gathered into a display window, the user can select one or more objects from the virtual window. In some embodiments, after selection, the selected objects are highlighted. The highlighting can be a shadowing (e.g., lightening or darkening of pixels near the object, etc.).

In some embodiments, in response to the selection, only those objects that are selected still appear in the virtual window, while all the other objects return to their original location in the user interface display in the virtual environment. In some embodiments, the unselected objects are returned to their original position in response to selection of a GUI element (e.g., a return button, etc.) being displayed in the user interface of the virtual environment. In some embodiments, the gather button is also used to "ungather" the objects. In other words, when the user wants to ungather return non-selected objects (e.g., all of the objects, a subset of objects, etc.) to their original position, the user selects the gather button (or other GUI) element again in the virtual environment to cause the objects to return. In some embodiments, the XR device changes the visual representation of the gather button (e.g., its color, label, etc.) after it is used to gather the objects to indicate to the user that it may be used for ungathering of objects. In some other embodiments, the user selects the gather button multiple times in succession to ungather objects. Note that the XR device maintains object location information indicative of an objects location in the virtual environment and uses this information to return an object to its original location when "ungathering".

In some embodiments, the XR device enables a user to manipulate one or more of the gathered objects being displayed in a virtual area (e.g., window) as a result of selecting the gather button. In some embodiments, the manipulation enabled by the XR device includes controlling the object by rotating, moving, scaling, or otherwise changing the display of the object within the virtual window. In one embodiment, any altering of an object remains after use of the gathering function has ended and the object has returned to its original position. In other words, if an object has been rotated, scaled or moved, the result visual representation of the object remains when the object is returned to its original location in the virtual environment. In some other embodiments, after the user has finished manipulating objects that were gathered, the objects return to their original position in the display in an unaltered state.

In some embodiments, the XR device implements the manipulation of objects using a smart watch. An XR device controlling an object by rotating, moving, scaling, or otherwise changing the display of the object within the virtual window using a smart watch is described, for example, in U.S. patent application Ser. No. 18/119,720, entitled "XR Manipulation Feature with Smart Watch", concurrently filed on Mar. 9, 2023. However, the XR device can use other techniques to perform such object manipulations.

Figure 3A:
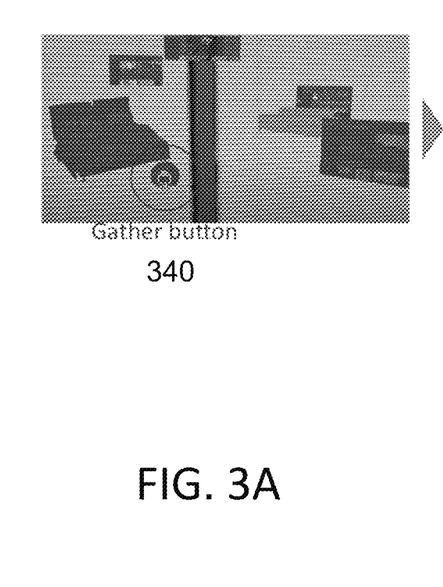
FIGS. 3A-3C illustrate some embodiments of multi-window control to control a user interface in an XR device.
Figure 3B:
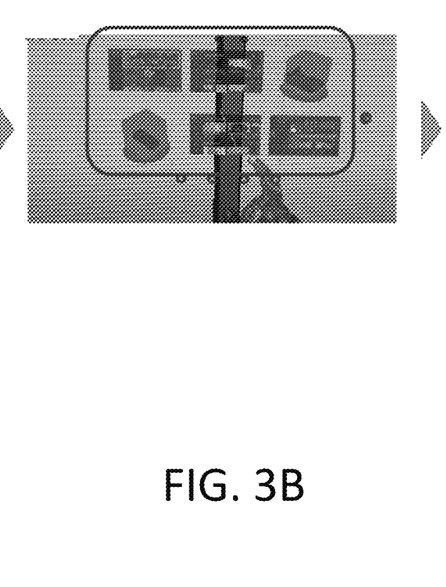
Figure 3C:
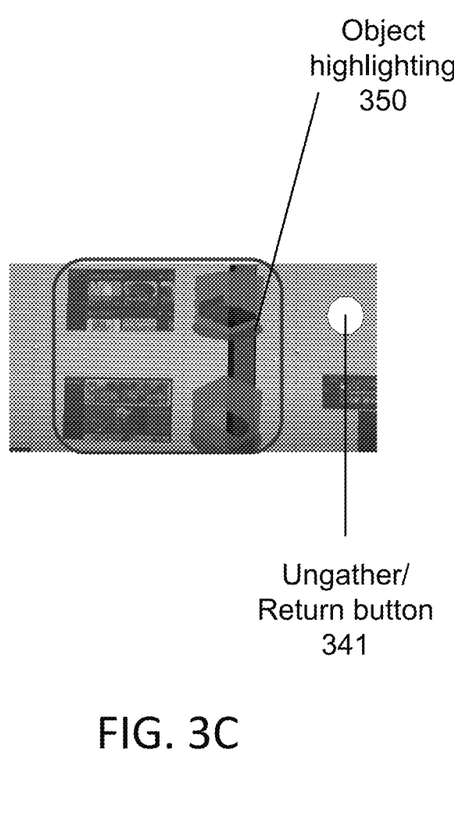

FIGS. 3A-3C illustrate some embodiments of multi-window control to control a user interface in an XR device. Referring to FIG. 3A, a user interface of an XR device is displayed to a user. As shown, the user interface in the XR device displays 2D windows and objects scattered in the virtual room. The user interface also includes a gather button that may be selected by a user to gather the objects. FIG. 3B illustrates an example of the resulting user interface after the user pressing the gather button. Referring to FIG. 3B, when the gather button is selected, the objects are gathered neatly. The user can select a subset of objects being displayed in front of them and to reduce the number of objects that are gathered. FIG. 3C illustrates objects that were selected by the user from the gathered objects shown in FIG. 3B. The selected objects are shown in front of the user and the user can change their position by selecting them and performing other user interface actions.

Figure 4:
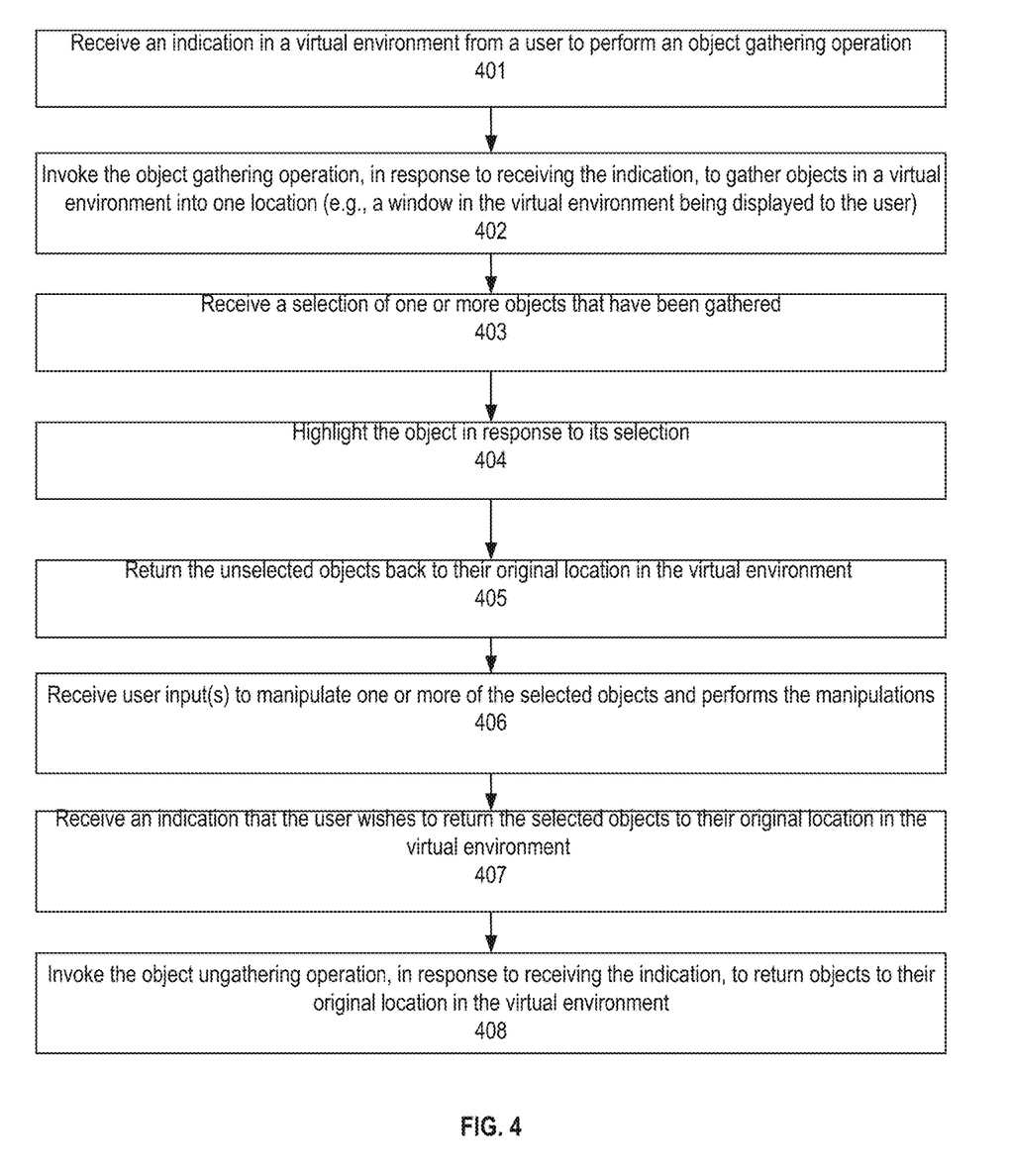
FIG. 4 is a flow diagram of some embodiments of a process for performing multi-window control in the user interface.

FIG. 4 is a flow diagram of some embodiments of a process for performing multi-window control in the user interface. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by an XR device.

Referring to FIG. 4, the process begins by processing logic receiving an indication in a virtual environment from a user to perform an object gathering operation (processing block 401). In some embodiments, the XR device displays a gather button (or other GUI element) and receives an indication that the user has engaged (e.g., pressed, selected, etc.) the gather button (or other GUI element) to request that the object gather operation be performed. In some embodiments, processing logic detects a selection of the gather button via tapless selection by determining hand position of the user has been maintained in a position that that is directed on the gather button for a predetermined time. In some other embodiments, processing logic detects a selection of the gather button by tracking the hand and thumb or finger position of the user. In response to receiving the indication, processing logic invokes the object gathering operation to gather objects in a virtual environment into one location (e.g., a window in the virtual environment being displayed to the user) (processing block 402).

After performing the object gathering operation, processing logic receives a selection of one or more objects that have been gathered (processing block 403). In some embodiments, processing logic detects a selection of an object by via tapless selection by determining hand position of the user has been maintained in a position that that is directed on an object for a predetermined time. In some other embodiments, processing logic detects a selection of one or more objects in the window by tracking the hand and thumb or finger position of the user.

In response to selecting an object, processing logic highlights the object (processing block 404). In some embodiments, the XR device performs shading on the object for highlighting the object. In some embodiments, the XR device make the object appear bolder in order to highlight the object.

After receiving selection of one or more of the gathered objects, processing logic returns the unselected objects back to their original location in the virtual environment (processing block 405). In some embodiments, the XR device returns the unselected objects back to their original location in the virtual environment in response to receiving selection by a user of a GUI element (e.g., an ungather button, reselection of the gather button, etc.).

Processing logic receives user input(s) to manipulate one or more of the selected objects and performs the manipulations (processing block 406). In some embodiment, processing logic performs an object manipulation in response to a detected movement of the user. Examples of the manipulations include rotating an object, scaling an object, moving an object, etc.

After any desired manipulations have been performed, processing logic receives an indication that the user wishes to return the selected objects to their original location in the virtual environment (processing block 407). In some embodiments, the XR device displays an ungather GUI element (e.g., an ungather button, etc.) and receives an indication that the user has engaged (e.g., pressed, selected, etc.) the ungather GUI element to request that the gathered and selected object(s) being returned to their original location in the virtual environment. In some embodiments, processing logic detects a selection of the ungather GUI element via tapless selection by determining hand position of the user has been maintained in a position that that is directed on the ungather GUI element for a predetermined time. In some other embodiments, processing logic detects a selection of ungather GUI element by tracking the hand and thumb or finger position of the user. In response to receiving the indication, processing logic invokes the object ungathering operation to return objects to their original location in the virtual environment (processing block 408).

Figure 5:
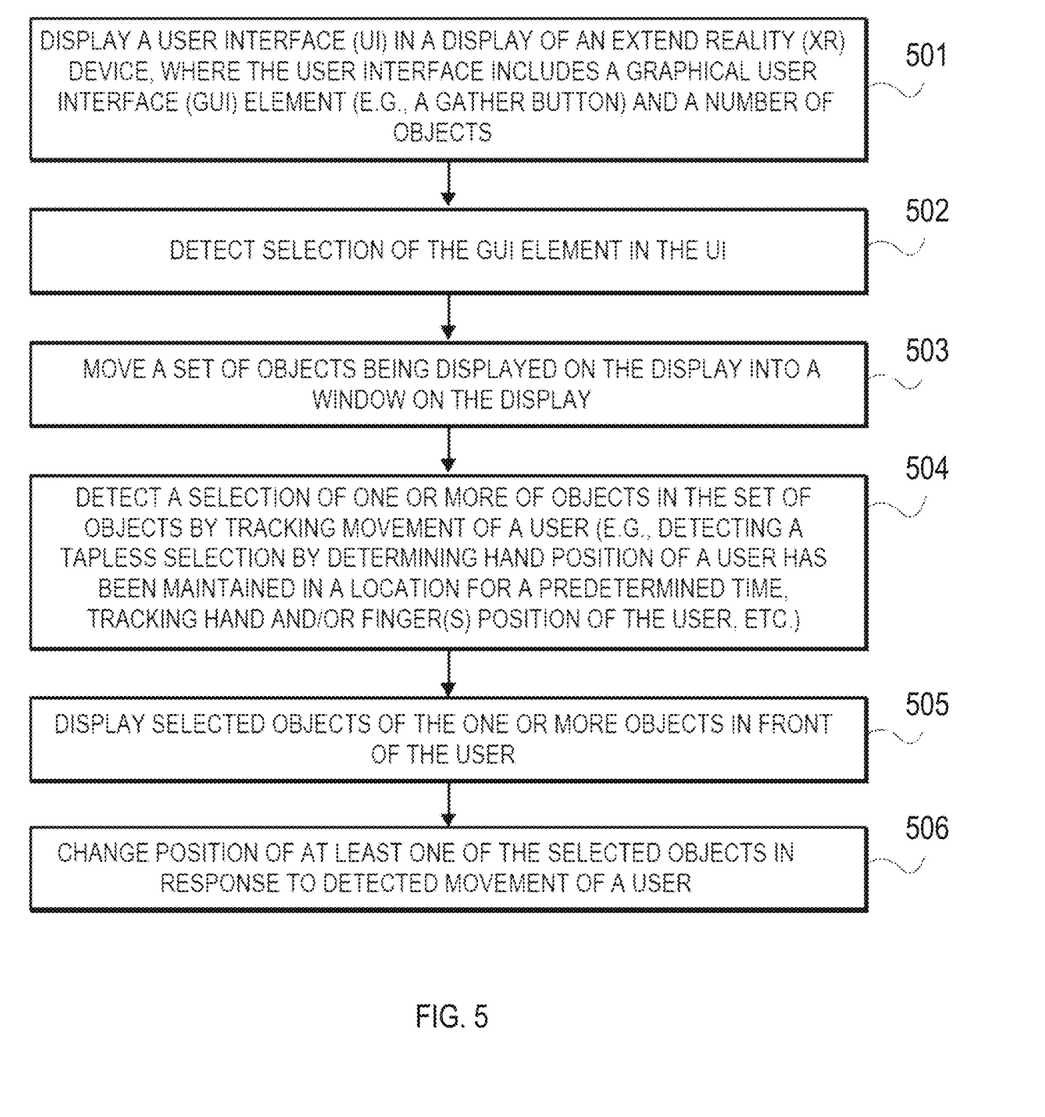
FIG. 5 is a flow diagram of some other embodiments of a process for performing multi-window control in the user interface.

FIG. 5 is a flow diagram of some other embodiments of a process for performing multi-window control in the user interface. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by an XR device.

Referring to FIG. 5, the process begins by processing logic displaying the user interface in a display of an extended reality (XR) device (processing block 501). In some embodiments, the user interface includes a graphical user interface (GUI) element and a number of objects. In some embodiments, the GUI element comprises a gather button. However, other types of GUI elements may be used.

While displaying user interface, processing logic detects a selection of the GUI element in the user interface (processing block 502) and moves a set of objects being displayed on the display into a window on the display (processing block 503). In one embodiment, the GUI element comprises a gather button. In some embodiments, the window is a 2D window and objects are displayed in rows and columns. Alternatively, the objects may be arranged in other ways or even randomly displayed in the 2D window.

Thereafter, while the objects are displayed as a result of selecting the GUI button, processing logic detects a selection of one or more of the objects in the 2D window by tracking movement of a user (processing block 504). In some embodiments, processing logic detects a selection of an object by via tapless selection by determining hand position of the user has been maintained in a position that that is directed at a GUI element for a predetermined time. In some other embodiments, processing logic detects a selection of one or more objects in the window by tracking the hand and thumb or finger position of the user.

In response to the selection, processing logic displays the selected objects of one or more objects in front of the user (processing block 505). For example, if there are six objects that are displayed in the 2D window as a result of the user selecting the gather button and the user selects four objects, then the 2D window is updated and only those four selected objects remain in the window.

Also, processing logic changes position of at least one of the objects in the 2D window (processing block 506). In some embodiment, processing logic changes position of an object in response to a detected movement of the user. Examples of the positional changes include rotating an object, scaling an object, moving an object, etc.

As discussed above, in some embodiments, the user interface (UI)/user experience (UX) of the XR device includes a tapless selection feature to select objects, graphical user interface (GUI) elements (e.g., buttons, menus, etc.), or other items in the virtual environment being displayed in the UI of the XR device. In some embodiments, when performing tapless selection, the users don't have to do anything other than keep their hands in position for a predetermined period of time. That is, as long as the person can keep their hand position towards an object the user wants to select for a certain period of time, the XR device is able to determine that the object the user wants to select and makes the selection. As long as the user's hand and/or fingers are paused at a specific position for a predetermined amount of time, users are able to use the tapless selection feature to select menus or icons that are being displayed in the user interface of the XR device. In some embodiments, the predetermined time can be set with variable times. For example, in some embodiments, the predetermined period of time that a user must hold or pause their hand and/or fingers to the specific position is one second or two seconds to select a menu or icon in the user interface of the XR device. In some embodiments, the predetermined time can be set and/or optimized based on the application. In some embodiments, the user interface displays an indicator once the hand and/or fingers are paused or maintained in a specific position. This indicator indicates the amount of time remaining to have the position held in order to perform the tapless selection. In some embodiments, the indicator is a closing circle in which a circle is formed in the user interface from a single point that continues to be drawn in a clockwise (or counterclockwise) direction until the starting point is reached. The time to draw the circle is the time a user needs to hold their hand and/or finger(s) in position to select an item in the user interface. Note that other indicators may be used. An example of an XR device that performs tapless selection is described in, for example, in U.S. Provisional Patent Application Ser. No. 63/393,172, entitled "XR Tapless Selection", filed on Jul. 28, 2022, incorporated herein by reference.

Figure 6:
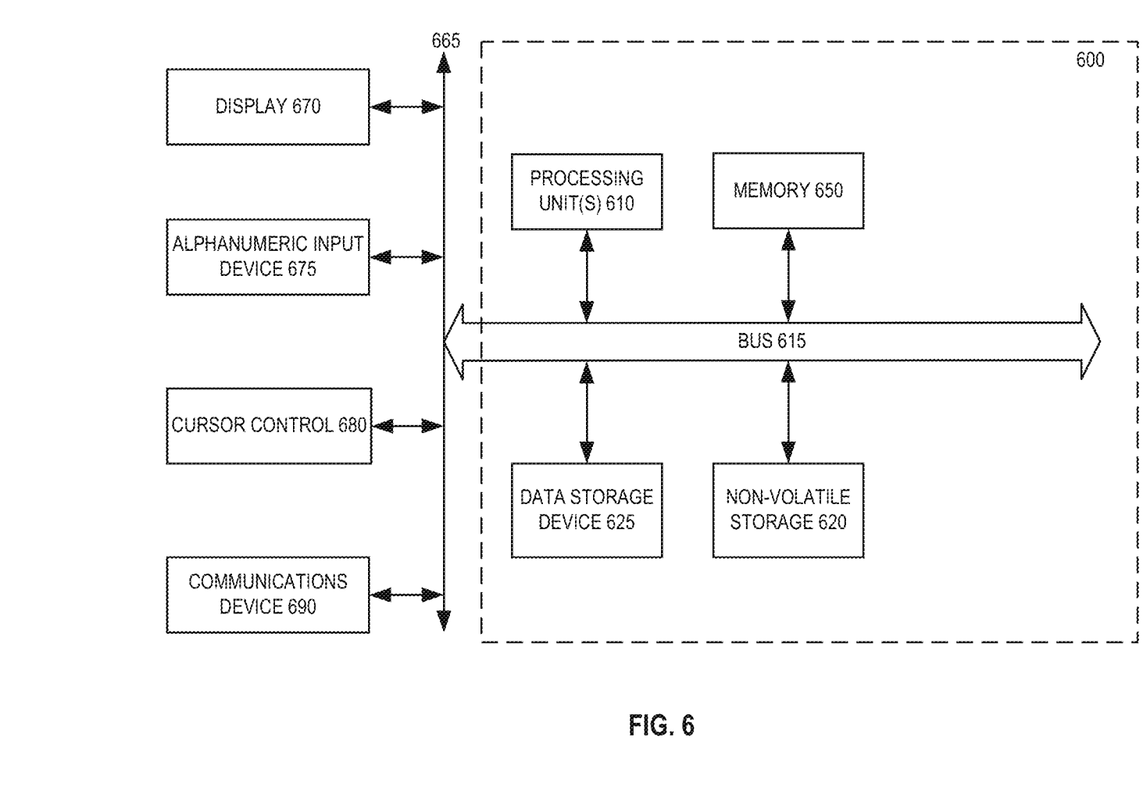
FIG. 6 is one embodiment of a computer system that may be used to support the systems and operations discussed herein, including those of the XR device.

FIG. 6 is one embodiment of a computer system that may be used to support the systems and operations discussed herein, including those of the XR device. It will be apparent to those of ordinary skill in the art, however that other alternative systems of various system architectures may also be used.

The data processing system illustrated in FIG. 6 includes a bus or other internal communication means 615 for communicating information, and one or more processor(s) 610 coupled to the bus 615 for processing information. The system further includes a random-access memory (RAM) or other volatile storage device 650 (referred to as memory), coupled to bus 615 for storing information and instructions to be executed by processor(s) 610. Main memory 650 also may be used for storing temporary variables or other intermediate information during execution of instructions by processor(s) 610. The system also includes a read only memory (ROM) and/or static storage device 620 coupled to bus 615 for storing static information and instructions for processor(s) 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor(s) 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

There are a number of example embodiments described herein.

Example 1 is a method for performing multi-window control in a user interface, the method comprising: displaying the user interface in a display of an extend reality (XR) device, the user interface including a graphical user interface (GUI) element and a number of objects; detecting selection of the GUI element in the UI; moving a set of objects being displayed on the display into a window on the display; detecting a selection of one or more of objects in the set of objects by tracking movement of a user; and displaying selected objects of the one or more objects in front of a user.

Example 2 is the method of example 1 that may optionally include that changing position of at least one of the selected objects in response to detected movement of a user.

Example 3 is the method of example 1 that may optionally include that the GUI element is a gather button.

Example 4 is the method of example 1 that may optionally include that detecting selection of the GUI element in the UI comprises detecting a tapless selection by determining hand position of a user has been maintained in a location for a predetermined time.

Example 5 is the method of example 1 that may optionally include that tracking the movement of the user comprises tracking hand position of the user.

Example 6 is the method of example 1 that may optionally include that tracking the movement of the user comprises tracking one or more fingers of a user's hand.

Example 7 is a computing system comprising: one or more processors; and one or more memories storing instructions that, when executed by the one or more processors, cause the computing system to perform a process comprising: displaying the user interface in a display of an extend reality (XR) device, the user interface including a graphical user interface (GUI) element and a number of objects; detecting selection of the GUI element in the UI; moving a set of objects being displayed on the display into a window on the display; detecting a selection of one or more of objects in the set of objects by tracking movement of a user; and displaying selected objects of the one or more objects in front of a user.

Example 8 is the computing system of example 7 that may optionally include changing position of at least one of the selected objects in response to detected movement of a user.

Example 9 is the computing system of example 7 that may optionally include that the GUI element is a gather button.

Example 10 is the computing system of example 7 that may optionally include that detecting selection of the GUI element in the UI comprises detecting a tapless selection by determining hand position of a user has been maintained in a location for a predetermined time.

Example 11 is the computing system of example 7 that may optionally include that tracking the movement of the user comprises tracking hand position of the user.

Example 12 is the computing system of example 7 that may optionally include that tracking the movement of the user comprises tracking one or more fingers of a user's hand.

Example 13 is one or more non-transitory computer readable storage media having instructions stored thereupon which, when executed by a system having at least a processor and a memory therein, cause the system to perform operations comprising: displaying the user interface in a display of an extend reality (XR) device, the user interface including a graphical user interface (GUI) element and a number of objects; detecting selection of the GUI element in the UI; moving a set of objects being displayed on the display into a window on the display; detecting a selection of one or more of objects in the set of objects by tracking movement of a user; and displaying selected objects of the one or more objects in front of a user.

Example 14 is one or more non-transitory computer readable storage media of example 13 that may optionally include that the method further comprises changing position of at least one of the selected objects in response to detected movement of a user.

Example 15 is one or more non-transitory computer readable storage media of example 13 that may optionally include that the GUI element is a gather button.

Example 16 is one or more non-transitory computer readable storage media of example 13 that may optionally include that detecting selection of the GUI element in the UI comprises detecting a tapless selection by determining hand position of a user has been maintained in a location for a predetermined time.

Example 17 is one or more non-transitory computer readable storage media of example 13 that may optionally include that tracking the movement of the user comprises tracking hand position of the user.

Example 18 is one or more non-transitory computer readable storage media of example 13 that may optionally include that tracking the movement of the user comprises tracking one or more fingers of a user's hand.

Example 19 is one or more non-transitory computer readable storage media of example 13 that may optionally include that the GUI element is a gather button, and further wherein detecting selection of the GUI element in the UI comprises detecting a tapless selection by determining hand position of a user has been maintained in a location for a predetermined time.

Example 20 is one or more non-transitory computer readable storage media of example 13 that may optionally include that the method further comprises returning one or more objects to their original location in the virtual environment after receiving selection of another GUI element.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the disclosure.

We claim:

1. A method for performing multi-window control in a user interface, the method comprising:
   displaying the user interface in a display of a virtual environment created by an extend reality (XR) device, the user interface including a single graphical user interface (GUI) element and a number of objects;
   detecting selection of the GUI element in the UI, wherein the single GUI element is a gather button;
   in response to detecting selection of the GUI element, gathering a set of manipulatable objects being displayed in the virtual environment and scattered in an area in the virtual environment in which a user is located, by moving objects in the set of objects into a window on the display in front of the user where each object in the set of objects may be selected;
   detecting a selection of one or more objects in the set of manipulatable objects by tracking movement of the user;
   displaying selected objects of the one or more manipulatable objects in front of a user and returning non-selected objects to their location in the virtual environment prior to being moved into the window;
   selecting one or more operations from a set of operations to perform on at least one of the selected objects, wherein the set of operations comprises rotating the at least one selected object, scaling the at least one selected object, and moving the at least one object;
   in response to selecting the one or more operations, performing the one or more operations on the at least one of the selected objects; and
   returning the selected objects to their location in the virtual environment prior to being moved into the window, wherein any altering of the selected objects that resulted from performing the one or more operations remains after returning the selected objects to their location in the virtual environment.

2. The method of claim 1 further comprising changing position of at least one of the selected objects in response to detected movement of a user.

3. The method of claim 1 wherein detecting selection of the GUI element in the UI comprises detecting a tapless selection by determining hand position of a user has been maintained in a location for a predetermined time.

4. The method of claim 1 wherein tracking the movement of the user comprises tracking hand position of the user.

5. The method of claim 1 wherein tracking the movement of the user comprises tracking one or more fingers of a user's hand.

6. The method of claim 1 wherein the area comprises a room in the virtual environment, and the set of manipulatable objects being displayed in the virtual environment includes objects in the room that are in front of, in back of, and on one or more sides of the user.

7. The method of claim 1 wherein returning non-selected objects to their location in the virtual environment prior to being moved into the window occurs in response to selecting the gather button again.

8. The method of claim 1 further comprising changing a visual representation of the gather button after selecting the gather button to indicate to the user that selection of the gather button again will cause ungathering of objects in the set of the set of manipulatable objects.

9. A computing system comprising:
   one or more processors; and one or more memories storing instructions that, when executed by the one or more processors, cause the computing system to perform a process comprising:

displaying the user interface in a display of a virtual environment created by an extend reality (XR) device, the user interface including a single graphical user interface (GUI) element and a number of objects;

detecting selection of the GUI element in the UI, wherein the single GUI element is a gather button;

in response to detecting selection of the GUI element, gathering a set of manipulatable objects being displayed in the virtual environment and scattered in an area in the virtual environment in which a user is located, by moving objects in the set of objects into a window on the display in front of the user where each object in the set of objects may be selected;

detecting a selection of one or more objects in the set of manipulatable objects by tracking movement of the user;

displaying selected objects of the one or more manipulatable objects in front of a user and returning non-selected objects to their location in the virtual environment prior to being moved into the window;

selecting one or more operations from a set of operations to perform on at least one of the selected objects, wherein the set of operations comprises rotating the at least one selected object, scaling the at least one selected object, and moving the at least one object;

in response to selecting the one or more operations, performing the one or more operations on the at least one of the selected objects; and returning the selected objects to their location in the virtual environment prior to being moved into the window, wherein any altering of the selected objects that resulted from performing the one or more operations remains after returning the selected objects to their location in the virtual environment.

10. The computing system of claim 9 further comprising changing position of at least one of the selected objects in response to detected movement of a user.

11. The computing system of claim 9 wherein detecting selection of the GUI element in the UI comprises detecting a tapless selection by determining hand position of a user has been maintained in a location for a predetermined time.

12. The computing system of claim 9 wherein tracking the movement of the user comprises tracking hand position of the user.

13. The computing system of claim 9 wherein tracking the movement of the user comprises tracking one or more fingers of a user's hand.

14. One or more non-transitory computer readable storage media having instructions stored thereupon which, when executed by a system having at least a processor and a memory therein, cause the system to perform operations comprising:

displaying the user interface in a display of a virtual environment created by an extend reality (XR) device, the user interface including a single graphical user interface (GUI) element and a number of objects;

detecting selection of the GUI element in the UI, wherein the single GUI element is a gather button;

in response to detecting selection of the GUI element, gathering a set of manipulatable objects being displayed in the virtual environment and scattered in an area in the virtual environment in which a user is located, by moving objects in the set of objects into a window on the display in front of the user where each object in the set of objects may be selected;

detecting a selection of one or more objects in the set of manipulatable objects by tracking movement of the user;

displaying selected objects of the one or more manipulatable objects in front of a user and returning non-selected objects to their location in the virtual environment prior to being moved into the window;

selecting one or more operations from a set of operations to perform on at least one of the selected objects, wherein the set of operations comprises rotating the at least one selected object, scaling the at least one selected object, and moving the at least one object;

in response to selecting the one or more operations, performing the one or more operations on the at least one of the selected objects; and returning the selected objects to their location in the virtual environment prior to being moved into the window, wherein any altering of the selected objects that resulted from performing the one or more operations remains after returning the selected objects to their location in the virtual environment.

15. The one or more non-transitory computer readable storage media of claim 14 wherein the method further comprises changing position of at least one of the selected objects in response to detected movement of a user.

16. The one or more non-transitory computer readable storage media of claim 14 wherein detecting selection of the GUI element in the UI comprises detecting a tapless selection by determining hand position of a user has been maintained in a location for a predetermined time.

17. The one or more non-transitory computer readable storage media of claim 14 wherein tracking the movement of the user comprises tracking hand position of the user.

18. The one or more non-transitory computer readable storage media of claim 14 wherein tracking the movement of the user comprises tracking one or more fingers of a user's hand.

19. The one or more non-transitory computer readable storage media of claim 14 further wherein detecting selection of the GUI element in the UI comprises detecting a tapless selection by determining hand position of a user has been maintained in a location for a predetermined time.

20. The one or more non-transitory computer readable storage media of claim 14 wherein the method further comprises returning one or more objects to their original location in the virtual environment after receiving selection of another GUI element.

* * * * *